US007965867B2

(12) United States Patent
Lanz

(10) Patent No.: US 7,965,867 B2
(45) Date of Patent: Jun. 21, 2011

(54) METHOD AND APPARATUS FOR TRACKING A NUMBER OF OBJECTS OR OBJECT PARTS IN IMAGE SEQUENCES

(75) Inventor: Oswald Lanz, Bolzano (IT)

(73) Assignee: Fondazione Bruno Kessler, Trento (IT)

( * ) Notice: Subject to any disclaimer, the term of this patent is extended or adjusted under 35 U.S.C. 154(b) by 1019 days.

(21) Appl. No.: 11/773,483

(22) Filed: Jul. 5, 2007

(65) Prior Publication Data
US 2008/0031492 A1 Feb. 7, 2008

(30) Foreign Application Priority Data

Jul. 10, 2006 (EP) .................................. 06116896

(51) Int. Cl.
G06K 9/00 (2006.01)
(52) U.S. Cl. ........................................................ 382/103
(58) Field of Classification Search .................. 382/103, 382/106; 348/169, 171
See application file for complete search history.

(56) References Cited

U.S. PATENT DOCUMENTS

| 6,542,621 | B1 * | 4/2003 | Brill et al. | 382/103 |
| 6,674,877 | B1 * | 1/2004 | Jojic et al. | 382/103 |
| 6,826,292 | B1 * | 11/2004 | Tao et al. | 382/103 |
| 7,587,064 | B2 * | 9/2009 | Owechko et al. | 382/103 |
| 2003/0108220 | A1 * | 6/2003 | Jepson et al. | 382/103 |
| 2003/0219146 | A1 * | 11/2003 | Jepson et al. | 382/103 |
| 2005/0129311 | A1 * | 6/2005 | Haynes et al. | 382/170 |
| 2005/0185826 | A1 * | 8/2005 | Georgescu et al. | 382/103 |

OTHER PUBLICATIONS

Isard, M. and MacCormick, J.; BraMBLe, a Bayesian multiple-blob tracker, in Int. Conf. Computer Vision, 2003; XP010554066, Publication Date: 2001 vol. 2, On pp. 34-41 vol. 2.

Zhao, T. et al., Tracking Multiple Humans in Crowded Environment, IEEE *cvpr*, pp. 406-413, 2004 IEEE Computer Society Conference on Computer Vision and Pattern Recognition (CVPR'04)—vol. 2, 2004.
Otsuka, K. and Mukawa, N.; Multiview Occlusion Analysis for Tracking Densely Populated Objects Based on 2-D Visual Angles, *cvpr*, pp. 90-97, 2004 IEEE Computer Society Conference on Computer Vision and Pattern Recognition (CVPR'04)—vol. 1, 2004.
Cucchiara, R. et al.; Probalistic People Tracking for Occlusion Handling; Proceedings of the 17th International Conference on Pattern Recognition; (ICPR '04) pp. 132-135, XP010724167.
Zhou, Y. et al.; A background layer model for object tracking through occlusion; Proceedings of the 9th IEEE Conference on Computer Vision (ICCV) Nice, France, Oct. 13-16, 2003,; Dept. of Computer Engineering.
Lanz, O. et al.; Hybrid Joint-separable multibody tracking; Proceedings of the 2005 IEEE Computer Society Conference on Computer Vision and Recognition (CVPR '05).

* cited by examiner

*Primary Examiner* — Matthew C Bella
*Assistant Examiner* — Shervin Nakhjavan

(57) ABSTRACT

A method for tracking a number of objects or object parts in image sequences utilizes a Bayesian-like approach to object tracking, computing, at each time a new image is available, a probability distribution over all possible target configurations for that time. The Bayesian-like approach to object tracking computes a probability distribution for the previous image, at time (t−1), is propagated to the new image at time (t) according to a probabilistic model of target dynamics, obtaining a predicted distribution at time (t). The Bayesian-like approach to object tracking also aligns the predicted distribution at time (t) with the evidence contained in the new image at time (t) according to a probabilistic model of visual likelihood.

10 Claims, 5 Drawing Sheets
(4 of 5 Drawing Sheet(s) Filed in Color)

convolution

METHOD AND APPARATUS FOR TRACKING A NUMBER OF OBJECTS OR OBJECT PARTS IN IMAGE SEQUENCES

FIELD OF THE INVENTION

The present invention relates to a method and apparatus for tracking a number of objects or object parts in image sequences.

BACKGROUND

As known, video tracking is the process of locating a moving object (or several ones) in time using a camera (or several ones). An algorithm analyses the video frames and outputs the location, optionally in real time.

Visual tracking of multiple moving targets is a challenging problem. Independent tracking of individual bodies is a simple solution but fails in the presence of occlusions, where the disappearance of a target cannot be explained but in relationship with the other targets (the event in which the light emitted or reflected by an object is blocked by another object before it reaches the eye or camera where the image is taken, is called occlusion).

On the other hand, principled modeling of the occlusion process is possible when considering the joint configuration of all involved targets, and enables a single tracker in charge of estimating the joint dynamics of the different bodies to interpret images correctly during occlusion. This solution, however, requires a representation size that grows exponentially with the number of bodies, thus leading to an estimation algorithm whose computational complexity grows exponentially as well.

However, the problem of tracking the position and the velocity of a single target is well distinguished from the one of tracking the position of two or more different targets. Although both tasks can be formalized as a joint estimation problem, in the first case physical constraints impose a strong correlation of position and velocity, while in the second case the two components, the locations of the different objects, may depend only weakly from each other, if at all. Their measurements, however, may still be strongly correlated due to occlusions. This is the basic observation that has motivated the invention. In our method we deal with estimates separately, but analyze images jointly.

There are a number of acknowledged approaches described in the literature which address the multi-target/multi-part tracking problem.

In particular the article by M. Isard and J. MacCormick, BraMBLe, a Bayesian multiple-blob tracker, in *Int. Conf. Computer Vision,* 2003, appears to be a point of reference for the kind of probabilistic approach that this proposal addresses.

Other articles address similar problems, like T. Zhao and R. Nevatia, "Tracking Multiple Humans in Crowded Environment," *IEEE Conf. on Computer Vision and Pattern Recognition,* 2004; or K. Otsuka and N. Mukawa, "Multiview occlusion analysis for tracking densely populated objects based on 2-D visual angles," in *Int. Conf. Computer Vision and Pattern Recognition,* 2004.

The above references disclose implementing principled occlusion reasoning suffering from the problem of dimensionality resulting in heavy computational burden due to exponential complexity increase in the number of targets.

SUMMARY OF THE INVENTION

Therefore it is the main object of the present invention to provide a method and apparatus for tracking a number of objects or object parts in image sequences, which offers a considerable reduction in computational complexity.

The subject of this invention is a new method for tracking a number of objects or object parts based on their visual appearance observed in a plurality of successive image frames, which can handle multiple occlusions consistently and at an affordable computational cost.

The present invention offers two main contributions which allow solving the multitarget tracking problem at an affordable computational cost.

The first contribution provides a novel Bayesian framework tailored to sequential estimation problems of weakly coupled signals, like the ones describing trajectories of different targets to which we will refer from now on. Involved joint distributions are represented by the outer product of single target components, while updates are carried out using joint likelihood model. These updates produce nonseparable distributions which are mapped into single target spaces by a projection that guarantees minimal information loss. The key feature of the resulting model, dubbed Hybrid Joint-Separable (HJS), is its economical representation size that scales linearly with the number of targets.

The second contribution is the presentation of an occlusion robust multitarget appearance likelihood and an associated algorithm for an efficient update within the HJS model. The likelihood model is derived according to image formation principles and implements occlusion reasoning at pixel level.

The complexity of the HJS posterior update is quadratic in the number of tracked objects and linear in representation size of single target estimates.

Therefore the present method is unique in the way it handles occlusions in a principled way but maintains an affordable computational cost. The complexity of the method scales quadratically with the number of targets rather than exponentially, as in the known systems.

The method described hereafter addresses both scalability and robustness issues, providing a new solution which is robust to inter-object occlusions and remains practical at the same time. The method follows a Bayesian approach to object tracking: it computes, at each time a new image is available, a probability distribution over target configurations for that time. Bayesian tracking then involves two steps:

Prediction: the probability distribution computed for the previous image, at time (t−1), is propagated to the new image at time (t) according to a probabilistic model of target dynamics, obtaining a predicted, or prior, distribution at time (t); and Update: the predicted distribution at time (t) is then aligned with the evidence contained in the new image at time (t) according to a probabilistic model of visual likelihood, obtaining a posterior distribution at time (t).

More specifically, the method in accordance with the present invention computes the posterior distribution value, or probability density, in the Update step, of any hypothetic target configuration associated with a new frame by performing image analysis, in the following way:

the image portion in which the target under consideration is expected to be visible under the current configuration is identified, by using a shape rendering function, namely a user-defined shape model of the target that is rendered onto the image for the specific configuration under analysis;

a probability value is assigned to each pixel of the identified image portion, which is computed as the probability of being occluded by another target, the probability being derived from other targets' prior distributions and their shape model;

a degree of dissimilarity is computed, in a user-defined way, between visual features extracted from the identified image portion and a corresponding characterization, or appearance model, of the target, the importance, or weight, of the different pixels in this calculation being thereby calculated by said probability of being occluded;

to said value of degree of dissimilarity, a further dissimilarity term per each other tracked target is added, each such other target-term being computed in form of the expectation, under its prior distribution, of the dissimilarity values calculated on those configurations that map closer to the camera (or to any other shooting or picture recording device used) than the one of the target under analysis, the target currently under consideration being neglected; and the distribution value assigned to the hypothesized configuration of the target under analysis is finally calculated by multiplying the prior value with the negative exponential of the overall dissimilarity score as obtained according to the previous two items.

With the term "any hypothetic target configuration" it is meant not only the location of a moving subject, but also the posture, the orientation, the leg or arm angles, of any simple or articulated subjects, etc.

The above list of operations has to be repeated for each target configuration on which the value of the probability distribution has to be determined. For example, in a Particle filter implementation of the method, the list of operations has to be executed for each single element of the sample set that has been chosen to represent the distribution (i.e., for each particle). However, the method is by no means limited to being applied to such realization. The present invention is about a new routine to compute the update step of a multi-body/multi-part Bayes filter, which might be realized on a computer through approximate implementation of it, including, but not limited to, Kalman Filter, Particle Filter, Markov Chain Monte Carlo (MCMC) Filter, PhD Filter, Rao-Blackwellised Particle Filter, Grid Filter, Kernel Filter, Belief Propagation, Non-parametric Belief Propagation, PAMPAS, etc.

These and further objects are achieved by means of a method and apparatus for tracking a number of objects or object parts in image sequences, as described in the attached claims, which are considered an integral part of the present description.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The invention will become fully clear from the following detailed description, given by way of a mere exemplifying and non limiting example, to be read with reference to the attached drawing figures, wherein.

DETAILED DESCRIPTION

The present invention is about a new functional routine which computes the update step of a multi-body/multi-part Bayes filter (or any approximate implementation of it including, but not limited to, Kalman Filter, Particle Filter, Markov Chain Monte Carlo (MCMC) Filter, PhD Filter, Rao-Blackwellised Particle Filter, Grid Filter, Kernel Filter, Belief Propagation, Non-parametric Belief Propagation, PAMPAS, etc.):

for a specific, approximate, representation of target configuration distribution;

using a specific form of visual likelihood that implements the visual occlusion process, which however is completely generic w.r.t the type of image cues used (including, but not limited to, image gradients, edges, color, optical flow, motion layers, texture, wavelets, feature points, etc., or any combination of them); and built upon an explicit shape model of the target(s).

In the following each of the above items is specified rigorously, build upon an explicit shape model of the target(s).

Figure 1:
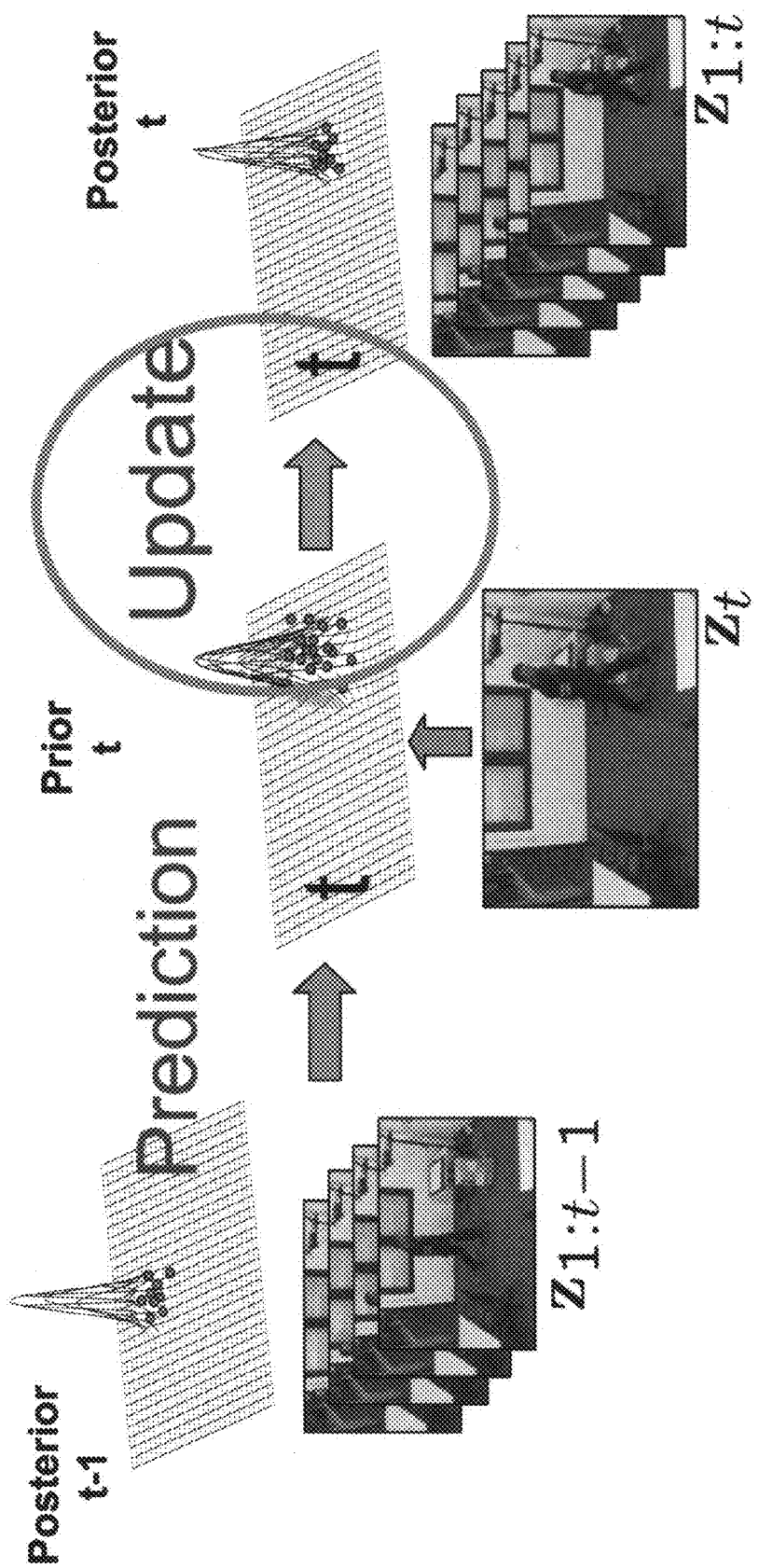
FIG. 1 shows an example of Bayes filter iteration according to known criteria.

FIG. 1 shows an example of Bayes filter iteration according to known criteria: the posterior distribution computed for time t-1 (Posterior t-1) is first projected to time t according to a Prediction model to get a prior distribution for time t (Prior t), and then updated with the likelihood evaluated on the new image, to get a Posterior distribution at time t (Posterior t).

This section describes the type of estimate representation the method calculates.

The configuration of a target within the monitored scene is represented on a computer by an n-dimensional vector, x, the target state. A target can be, for example but not in a limiting sense, a single object, or a part of it such as the upper leg of a person, or a joint of a mechanical arm of a robotic platform.

This state can simply be the image coordinates of the centroid of the object, or the spatial position of a person measured on the floor plane, or a high-dimensional description of its posture in terms of joint angles, etc. Let $x_t^k$ denote the state of a target k at time t, where k is a unique identifier associated to each target. The joint conditional distribution $p(x_t^{1:K}|z_{1:t})$ of a number of targets 1, ..., K, which can all be of the same type or even of different types and thus each $x_t^k$ may have different dimension and meaning, is defined as the distribution over the combined, joint, state vector $x_t^{1:K}=(x_t^1,\ldots,x_t^K)$ of all the targets, conditioned on the sequence of images $z_{1:t}=(z_1,\ldots,z_t)$.

The method proposed here computes an approximate representation $q(x_t^{1:K}|z_{1:t})$ of $p(x_t^{1:K}|z_{1:t})$ which is given by the product of its marginal components $$q(x_t^{1:K}|z_{1:t}) = \prod_{k=1}^{K} q(x_t^k|z_{1:t}) \quad (1)$$

with $$q(x_t^k|z_{1:t}) = \int p(x_t^{1:k}|z_{1:t}) dx_t^{1:K|k} \quad (2)$$

(superscript 1:K|k enumerates all object indices but k) where distribution $p(x_t^{1:K}|z_{1:t})$ in equation (2) comes from a Bayes-like filter update $$p(x_t^{1:K}|z_{1:t}) \propto p(z_t|x_t^{1:K}) \prod_{k=1}^{K} q(x_t^k|z_{1:t-1}), \quad (3)$$

$q(x_t^k|z_{1:t-1})$ is the predicted distribution for target k at time t, and $p(z_t|x_t^{1:K})$ is a likelihood function of the type defined in section "Occlusion robust visual likelihood."

Relation (3) defines an equivalence up to a proportionality factor which is independent of $x_t^k$, and will thus be omitted since it does not alter the shape of the distribution to be estimated (its shape contains all the information requested for tracking purpose).

This section describes the shape rendering function of a target and its representation that is used as input to the method. Each target k has a rendering procedure associated to the numeric description chosen, denoted by $g^k(x^k)$. This function provides, for a given configuration $x^k$ of the target, a depth map of the target as seen from a given camera. Precisely, it computes a real-valued scalar image whose pixels contain the distance of the target surface, or an approximation of it, from the camera optical centre; in pixels where the object is not visible, a reserved value, e.g., $\infty$, is assigned.

Figure 2:
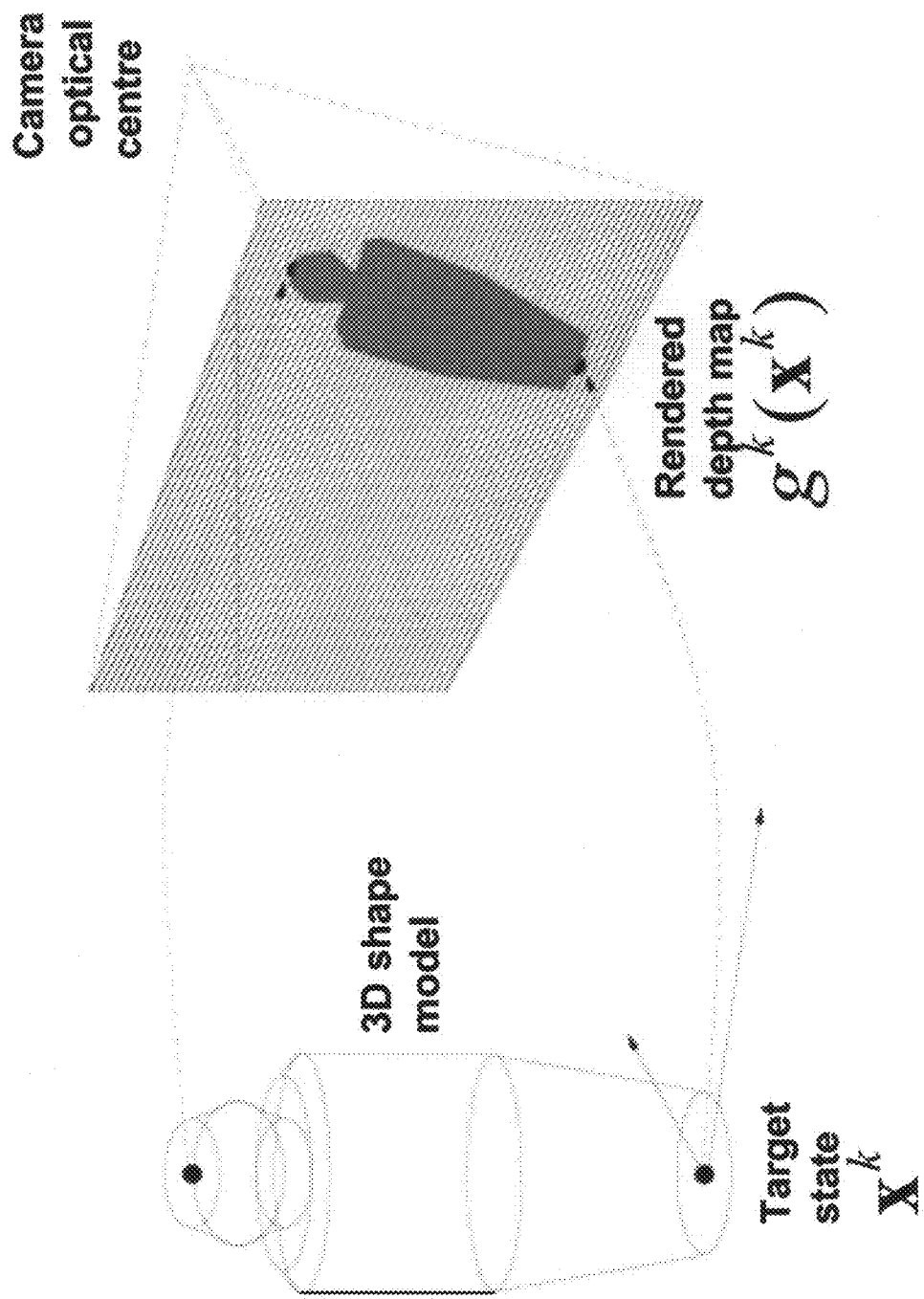
FIG. 2 shows an example of implementation of the shape rendering function according to the invention.

An example of an implementation of this function is given in FIG. 2, showing a functional procedure of an example shape rendering function for a person tracking task. A coarse 3D model is adopted for shape, target state $x^k$ is encoded as its 2D position on the floor plane. Given a calibrated model of the camera, a depth map $g^k(x^k)$ can be computed (i.e., by Computer Graphics techniques, such as ray-tracing or polygonal mesh rendering). Distance is green-coded, textured regions are at infinity.

This section describes the specific type of visual likelihood function $p(z|x^{1:K})$ on which the method operates. $p(z|x^{1:K})$ is a real-valued function of joint configuration $x^{1:K}$ and image z, and operates as follows. Image z is subdivided into a set of image patches $z^1, \ldots, z^K$. Each patch $z^k$ is composed of image pixels in which $g^k(x^k)$, the associated shape rendering function instantiated for the camera which captured z and evaluated for the state represented by the k-th component of $x^{1:K}$, is different from $\infty$ and has smaller value that all the other depth maps $g^m(x^m)$ with $m \neq k$. Patch $z^k$, a short-hand for $z^k(x^{1:K})$, therefore represents the image portion in which target k is expected to be visible under hypothesis $x^{1:K}$.

Figure 3:
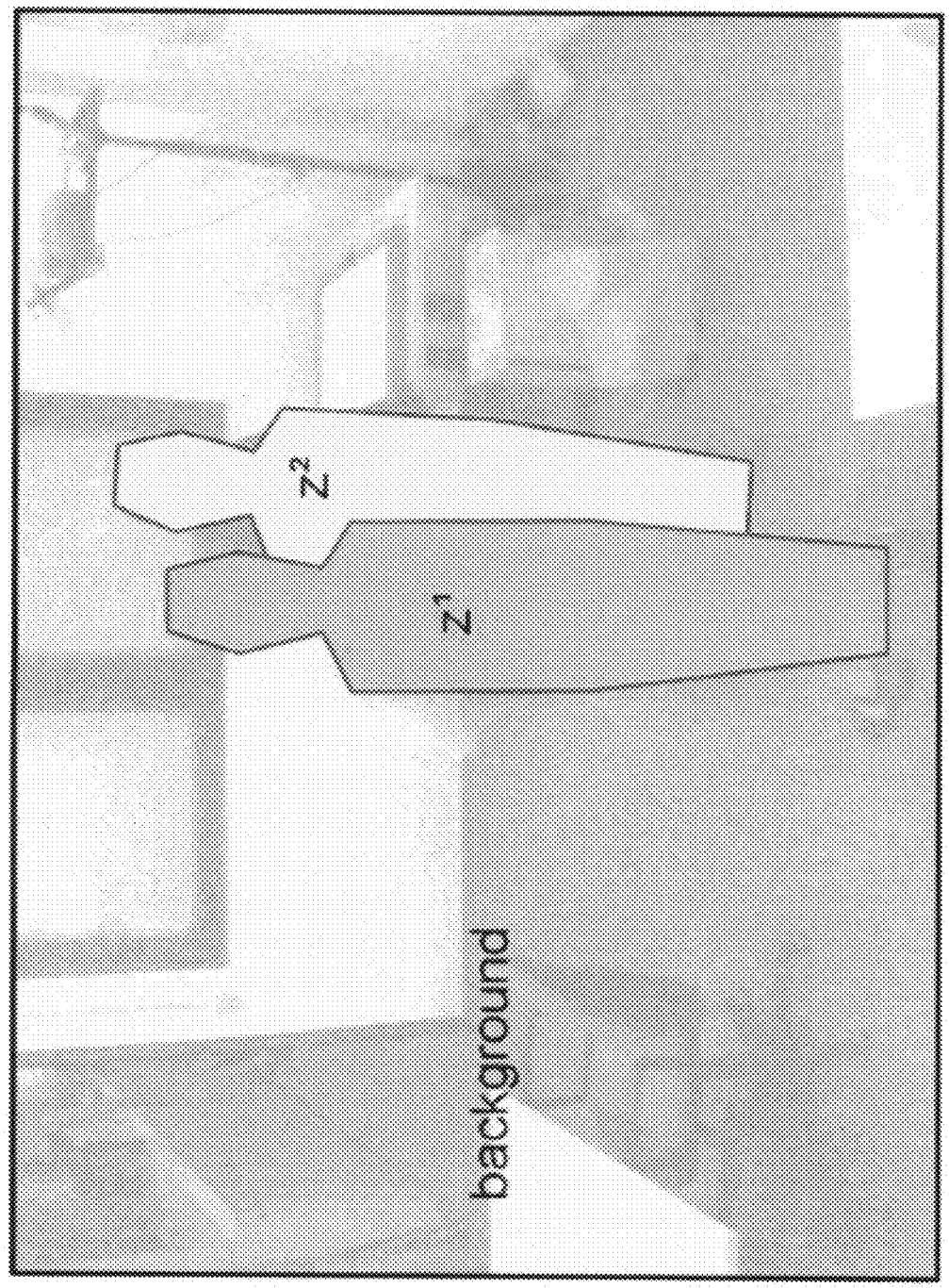
FIG. 3 shows an example of image partition by a Two-body image partitioning for an occlusion hypothesis using the shape rendering function, as from FIG. 2.

An example of image partition is given with reference to FIG. 3 which shows a Two-body image partitioning for an occlusion hypothesis using shape models as defined with reference to FIG. 2.

The likelihood function on which the method operates is given by the following expression $$-\log p(z|z^{1:K}) \propto \sum_{k=1}^{K} L^k(z^k|x^{1:K}), \quad (4)$$

with $L^k(z^k|x^{1:K})$ denoting a generic image log-likelihood function for target k only, that is evaluated on $z^k$ only.

In addition, for the method it is required each $L^k(z^k|x^{1:K})$ being a function that allows modulating the contribution of each single pixel of that portion to the overall score by providing a real-value weight map $\omega$ that defines the importance of each such pixel. To underline this property, let us rewrite each term in Eq. (4) by $L^k(z|\omega^k)$, where $\omega^k$, a short-hand for $\omega^k(x^{1:K})$, is a specific weight map computed as the characteristic function of the support of image patch $z^k$ under hypothesis $x^{1:K}$. Precisely, $\omega^k$ takes value 1 on the pixels associated to $z^k$, and 0 elsewhere. $L^k(z|\omega^k)$ can be built upon image cues such as gradients, edges, color, optical flow, stereo disparity, motion layers, texture, wavelets, feature points, etc., or any combinations of them.

As an example, $L^k(z|\omega^k)$ could be evaluated by means of Bhattacharrya-coefficient based distance between the color histogram of $z^k$ and a model histogram of target k.

The method subject of the invention introduces a new functional block that performs the update of approximate distribution defined in Eq. (1) in an efficient way using the likelihood function in Eq. (4).

Manipulations show that computing $q(x_t^k|z_{1:t})$ from Eq. (2), up to a proportionality factor, is equivalent to multiplying the temporal prior $q(x_t^k|z_{1:t-1})$ with the function $$f(z_t|x_t^k, z_{1:t-1}) = \int p(z_t|x_t^{1:K}) \prod_{m \neq k}^{K} q(x_t^m|z_{1:t-1}) dx_t^{1:K|k}. \quad (5)$$

(superscript 1:K|k enumerates all object indices but k).

Again, the proportionality factor can be omitted for the same reason as in Equation (3).

Under the specific form of likelihood defined in Equation (4), an approximation to $f(z_t|x_t^k, z_{1:t-1})$ is computed by $$-\log f(z_t|x_t^k, z_{1:t-1}) \approx L^k(z_t|w^k) + \sum_{m \neq k} \int L^m(z_t|w^{m|k}) q(x_t^m|z_{1:t-1}) dx_t^m \quad (6)$$

where $$w^k = \int \omega^k \prod_{m \neq k}^{K} q(x_t^m|z_{1:t-1}) dx_t^{1:K|k} \quad (7)$$

$$w^{m|k} = \int \omega^m \prod_{n \neq m,k}^{K} q(x_t^n|z_{1:t-1}) dx_t^{1:K|m,k}. \quad (8)$$

$w^k, w^{m|k}$ are now continuous-valued weight maps to be accounted for when evaluating $L^k, L^m$.

Equation (6), with Equations (7) and (8), define the mathematical framework of this invention.

Figure 4:
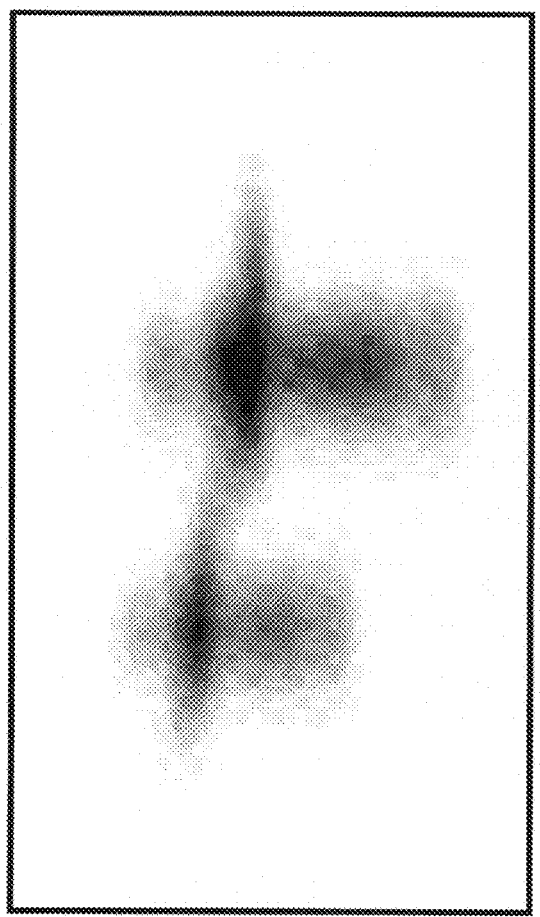
FIG. 4 shows an example of weight map.
Figure 4:
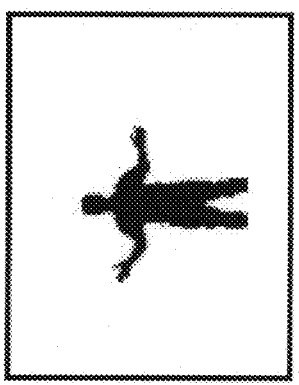
Figure 4:
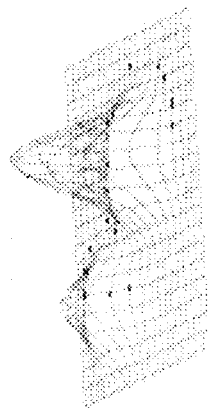

An example weight map is shown in FIG. 4, where on the left a high-dimensional shape model of a person in a specific pose and a bimodal distribution representing a possible prior estimate of the person's position is shown. The right image shows the corresponding weight map used to update the estimate of a second person hypothesized behind her: the template shape becomes blurred due to estimation uncertainty.

The key claim is that evaluating Eq. (6) can be accomplished in a number of computations that grows quadratically with the number of targets K; evaluating $f(z_t|x_t^k, z_{1:t-1})$ directly from Eq. (5) requires, instead according to known criteria, an exponential number of operations.

The gain in efficiency can be understood by rewriting $w^k$ (and similarly $w^{m|k}$) in the following form:

$$w^k(u) = \begin{cases} \prod_{m \neq k} \left(1 - \int_{x_t^m <_u x_t^k} q(x_t^m|z_{1:t-1}) dx_t^m \right) & \text{if } x_t^k <_u \infty \\ 0 & \text{elsewhere} \end{cases} \quad (9)$$

where $x_t^m <_u x_t^k$ identifies the set of configurations $x_t^m$ which, according to associated shape rendering function, render closer to the camera in pixel u than configuration $x_t^k$. Relation $x_t^k <_u \infty$ is meant to be true when $x_t^k$ is observable in pixel u. The gain comes from the fact that the computation of the joint integral in Eq. (5) is now partitioned into K single-space integrals in Eq. (6) and Eq. (9). In practice $w^k(u)$ is equal to 0 where $x_t^k$ is not observable (i.e. outside $z^k(x^{1:K})$), is close to 0 in the pixels in which occlusion is likely, and is equal to 1 in the pixels in which occlusion is certainly not present.

This section describes the implementation details of the method in a stand-alone fashion. The method presents a new way to perform the update step of a Bayes filter for visual multi-target tracking. In general, Bayesian tracking involves recursively computing the posterior distribution $p(x_t|z_{1:t})$ of some vectorial description of the configuration $x_t$ of a scene at time t in the following way:

$$p(x_t|z_{1:t}) \propto p(z_t|x_t)p(x_t|z_{1:t-1}) \quad (10)$$

where $p(z_t|x_t)$ is a likelihood function for hypothesis $x_t$ evaluated on the new image $z_t$ and $p(x_t|z_{1:t-1})$ is the prior distribution usually computed by prediction.

When multiple targets are present, this formula can be applied to compute a posterior distribution $q(x_t^k|z_{1:t})$ for each single target k. As shown in the previous section, each such distribution can be computed recursively from single-target priors $q(x_t^k|z_{1:t-1})$ by $$q(x_t^k|z_{1:t}) \propto f(z_t|x_t^k, z_{1:t-1})q(x_t^k|z_{1:t-1}) \quad (11)$$

where $f(z_t|x_t^k, z_{1:t-1})$ is a multi-target likelihood function which implements the occlusion process.

Evaluating f in a straightforward way conveys exponential complexity.

The novelty of the method then lies in the efficient implementation of an approximate version of it which is defined in the following way (see also Eq. (6)):

$$-\log f(z_t|x_t^k, z_{1:t-1}) \approx L^k(z_t|w^k) + \sum_{m \neq k} \int L^m(z_t|w^{m|k}) q(x_t^m|z_{1:t-1}) dx_t^m \quad (12)$$

Informally, $w^k, w^{m|k}$ are scalar images computed by the algorithm which attribute to each pixel of z a value in the range [0,1]. This value is interpreted by the method as the importance of that pixel when computing the likelihood score for target k. In other words, it encodes the predicted degree of visibility of k in the considered pixel. Formally, $w^k, w^{m|k}$ are computed for each pixel u as follows:

$$w^k(u) = \begin{cases} \prod_{m \neq k} \left(1 - \int_{x_t^m <_u x_t^k} q(x_t^m|z_{1:t-1}) dx_t^m\right) & \text{if } x_t^k <_u \infty \\ 0 & \text{elsewhere,} \end{cases} \quad (13)$$

$$w^{m|k}(u) = \begin{cases} \prod_{n \neq k,m} \left(1 - \int_{x_t^n <_u x_t^m} q(x_t^n|z_{1:t-1}) dx_t^n\right) & \text{if } x_t^m <_u x_t^k <_u \infty \\ 0 & \text{elsewhere,} \end{cases} \quad (14)$$

Here relations $x_t^m <_u x_t^k$ and $x_t^k <_u \infty$ are defined as for Equation (9), and can be resolved by using depth information provided by the shape rendering procedure.

An informal interpretation of the formula presented in Eq. 12, and a description of how to evaluate it, is given in the following.

Figure 5:
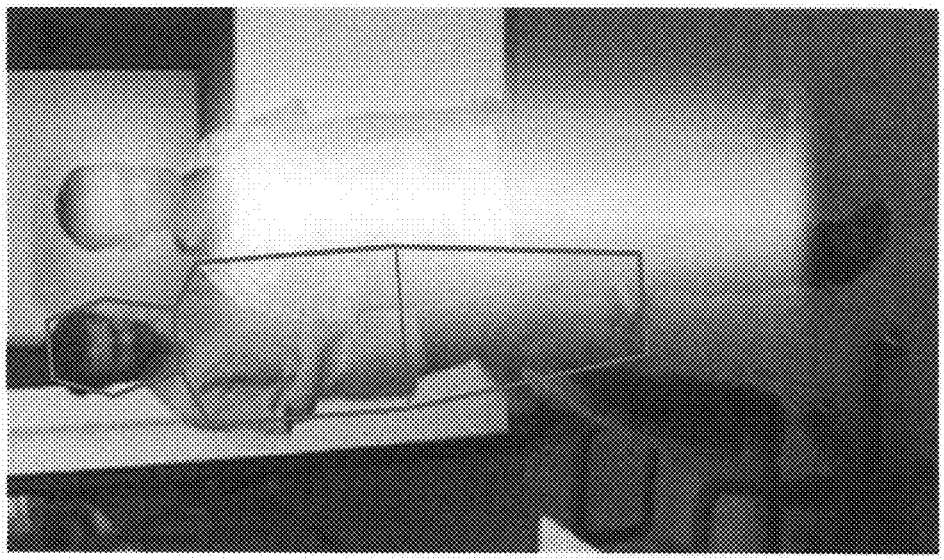
FIG. 5 shows a silhouette contour rendered at a hypothetic position $x^k$ of the target in background, say with index k, and corresponding weight map $w^k$ overlaid for visualization purpose as transparency mask.

The equation 12 is composed of several terms, one per target, whose roles are explained next based on FIG. 5, showing a silhouette contour rendered at a hypothetic position $x_t^k$ of the target in background, and corresponding weight map $w^k$ overlaid for visualization purpose as transparency mask.

$L^k(z_t|w^k)$ is called the foreground term. This term calculates a dissimilarity score between the image part where target k is expected to be visible, and its appearance model.

To compute this term, the image portion in which hypothesis $x_t^k$ is visible is identified by the shape rendering function is first calculated (the red contour in FIG. 5). Then, pixel weights $w^k$ are computed within this image area according to Eq. (13) (the transparency mask in FIG. 5), weighted appearance features are extracted from that region (e.g., weighted color histograms for head, torso and legs) and finally compared to the appearance model of the target. This comparison is made in terms of a distance function between extracted and modeled appearance features (e.g., Bhattacharrya-coefficient based distance between color histograms, as described for example in D. Comaniciu, V. Ramesh, and P. Meer, "Kernel-based object tracking," *IEEE Trans. on Pattern Analysis and Machine Intelligence*, vol. 25, no. 5, 2003) and defines the value of $L^k(z_t|w^k)$. The use of $w^k$ in this calculation has the effect of decreasing the influence of contributions due to pixels in which $x_t^k$ is supposed to be occluded by at least one other target.

$\int L^m(z_t|w^{m|k}) q(x_t^m|z_{1:t-1}) dx_t^m$ is called the background term. This term takes into account the occlusion evidence deriving from the presence of target $m \neq k$.

It is computed as the expectation of the foreground term of m under prior $q(x_t^m|z_{1:t-1})$ when the configuration of k is blocked to hypothesis $x_t^k$ under analysis. More in detail, for each $x_t^m$ a foreground score $L^m(z_t|w^{m|k})$ is computed as described above, using weight map $w^{m|k}$ defined in Eq. 14. These scores are modulated with the prior $q(x_t^m|z_{1:t-1})$ and finally integrated. The effect of using this term in the definition of f is to enforce occluded hypotheses if they are really occluded (i.e., when there is occlusion evidence within the image), and to weaken those who are not.

For reference purposes, a possible example of pseudo-code of a particle filter implementation of the method is given as follows, applying software criteria known per se.

---

Algorithm 1 Particle filter implementation of the proposed method

--- input: $\{<x_i^k, 1>\}$ are weighted particle sets representing $q(x_t^k|z_{1:t-1})$
update:
    order $\{x_i^k\}$ according to camera distance
    let $\{x_p\}$ denote the so obtained hybrid, ordered, particle set
    let $k_p$ denote the object index the particle $x_p$ belongs to
    initialize buffers $\{b_{fg}^k = N, b_{bg}^k = 0\}$
    for p = 1,...,N K do
        compute weight map $w^{kp} = w^{kp}(x_p) \prod_{m \neq k_p} (b_{fg}^m/N)$
        compute foreground term $l_1 = L^{kp}(z_t|w^{kp})$
        compute background term $l_2 = \sum_{m \neq k_p} \sum_u w_{[u]}^{kp}(x_p) bg_{[u]}^{kp}$
        assign particle weight $\pi_p = \exp(-\alpha(l_1 + l_2))$
        update foregroung buffer $b_{fg}^{kp} = b_{fg}^{kp} - w^{kp}(x_p)$
        foreach object index m ≠ $k_p$ do
            compute weight map $w^{kp|m} = w^{kp}(x_p) \prod_{n \neq m,k_p} (b_{fg}^n/N)$
            compute reduced foreground term $l_3 = L^{kp}(z_t|w^{kp}|m)$
            update background buffer $b_{bg}^{kp} = b_{bg}^{kp} + l_3 w^{kp|m} w^{kp}(x_p)$
output: $\{<x_i^k, \pi_i^k>\}$ are weighted particle sets representing $q(x_t^k|z_{1:t})$

---

In this realization, each target is assigned two image buffers, $b_{fg}^k$ and $b_{bg}^k$, which are used as support to incrementally calculate weight maps and background terms (mathematical operations on these buffers, as well as on $\omega^k$, without explicit reference to pixel values are intended to be applied at each single pixel). $\alpha$ is a parameter whose value has been determined empirically. With this realization, the complexity of the method is bounded by $O(K^2N)$, where K is the number of tracked targets and N is the number of particles used to represent each single distribution $q(x_t^k|z_{1:t})$. The term prediction $q(x_t^k|z_{1:t-1})$ can be computed according to known criteria. The particle set $\{<x_t^k, 1>\}$ representing prior $p(x_t^k|z_{1:t-1})$ can be computed from the particle representation of $p(x_{t-1}^k|z_{1:t-1})$ according to known criteria.

The method can be used to address any vision-based state estimation problem; among them we can cite: people tracking, vehicle tracking, human pose estimation, tracking of mechanical objects such as a robotic arm, target tracking from a mobile platform such as a robot, etc.

Potential application areas include: Domotics, Ambient Intelligence, Visual Monitoring, Visual Surveillance, Traffic Analysis, Vision-based Control and Automation, Human-Computer Interaction, Sports Event Analysis, Robotics, and others.

A multi-person tracking system based on the present invention can be realized as follows.

The apparatus is composed of a single Personal Computer (PC) with dual Intel XEON™ 3 GHz processor, and 4 non-synchronized cameras delivering RGB images at 15 Hz, connected to the PC via fire-wire. Image data captured by these cameras is made accessible to software implementation of the method via a software package of a known type (for example the software called "libVHPD1394").

In this realization, the following specifications over the general formulation subject of this invention have been made:
- target state is described as target position and velocity on the floor plane, thus for each target a distribution over a 4-dimensional state space is estimated;
- as common in many similar approaches, a linear-Gaussian dynamical model is assumed for each target to perform the prediction step of the Bayes filter;
- the shape rendering function depicted in FIG. 2 has been adopted;
- the appearance of the target has been characterized in terms of three body part color histograms (RGB, 8 uniform bins per channel): one for head, one for torso, and one for legs;
- $L^k(z|w^k)$ is evaluated by means of sum of Bhattacharryacoefficient based distance between extracted weighted body-part histograms and their pre-acquired models, body parts being thereby identified by the elements of the composite shape rendering function; and
- the proposed method has been implemented in form of a Particle filter as reported by the above Algorithm 1.

With these choices, the calculations involved have been translated into a computer program in form of C/C++ code. No particular software development methodology or technology has been used.

The realization allows real-time tracking of 5 people on complex indoor sequences involving several complete, temporally persistent, occlusions among multiple targets. The number of image streams used by the realization can be changed via software: it operates reliably during severe occlusions even when using the images of a single camera only.

Further implementation details will not be described, as the man skilled in the art is able to carry out the invention starting from the teaching of the above description.

The present invention can be advantageously implemented through a program for computer comprising program coding means for the implementation of one or more steps of the method, when this program is running on a computer. Therefore, it is understood that the scope of protection is extended to such a program for computer and in addition to a computer readable means having a recorded message therein, said computer readable means comprising program coding means for the implementation of one or more steps of the method, when this program is run on a computer.

By means of the present invention, a number of advantages are achieved.

Tracking is based on a sequential Bayesian approach, with the aim of estimating a probability distribution for each target defined over all its possible locations or, more generically, configurations. This has the advantage of providing estimates which can support multiple hypotheses and intrinsic uncertainty, expressed by multiple modes of any shape in the distribution, which is crucial for achieving robust tracking in complex scenes.

When occlusions exist among the targets, such distributions must be computed by considering jointly all targets involved when analyzing the images because of their visual dependencies.

This leads to tracking methods which convey computational complexity that scales exponentially with the number of targets, with obvious implications on real-time applications.

In this invention it is shown that an approximate form of such distributions can be computed much more efficiently, in quadratic complexity, while still applying joint image analysis. The resulting method then handles occlusions robustly, in a principled way, while maintaining an affordable computational cost. Based on the proposed method, a tracking system has been realized that allows real-time 3D tracking of 5 people on complex indoor sequences involving several complete, temporally persistent, occlusions among multiple targets.

Many changes, modifications, variations and other uses and applications of the subject invention will become apparent to those skilled in the art after considering the specification and the accompanying drawings which disclose preferred embodiments thereof. All such changes, modifications, variations and other uses and applications which do not depart from the spirit and scope of the invention are deemed to be covered by this invention.

What is claimed is:

1. A method for tracking a number of objects or object parts in image sequences, comprising following a Bayesian-like approach to object tracking, computing, at each time a new image is available, a probability distribution over target configurations for that time, said Bayesian-like approach to object tracking comprising:
    computing a probability distribution for the previous image, at time (t−1), and propagating the probability distribution to the new image, at time (t), according to a probabilistic model of target dynamics, to obtain a predicted, or prior, distribution at time (t); and
    aligning the predicted distribution, at time (t), with the evidence contained in the new image, at time (t), according to a probabilistic model of visual likelihood, to obtain a posterior distribution at time (t);
    wherein aligning the predicted distribution, at time (t), of a hypothetic target configuration associated with a new frame by performing image analysis includes,
        identifying the image portion in which the target under consideration is expected to be visible under the current configuration, by using a shape rendering function,
        assigning a probability value to each pixel of the identified image portion, which is computed as a probability of the target under consideration being expected to be visible under the current configuration being occluded by another target, the probability of the target under consideration being expected to be visible under the current configuration being occluded by another target being derived from prior distributions and shape models of other targets, computing a degree of dissimilarity between visual features extracted from the identified image portion and a corresponding characterization, or appearance model, of the target, an importance, or weight, of the different pixels being calculated by the probability of the target under consideration being expected to be visible under the current configuration being occluded, adding, to the value of degree of dissimilarity, a further dissimilarity term per each other tracked target, each further dissimilarity term being computed in form of an expectation, under a prior distribution, of the dissimilarity value, the expectation of dissimilarity value being calculated on configurations that map closer to an image recording device than the target under analysis wherein the target, currently under consideration, being neglected, and calculating a distribution value, assigned to the hypothetic target configuration of the target under analysis, by multiplying a prior value with a negative exponential of an overall dissimilarity score.

2. The method according to claim 1, wherein said distribution value assigned to the hypothetic target configuration of the target under analysis is calculated recursively according to:

$$q(x_t^k|z_{1:t}) \propto f(z_t|x_t^k, z_{1:t-1})q(x_t^k|z_{1:t-1})$$

where:

$x_t^k$ is the configuration of a scene at time t for a target k;

$z_t$ is the image at time (t);

$q(x_t^k|z_{1:t})$ is a posterior distribution for each single target k, when multiple targets are present, at time (t); and $q(x_t^k|z_{1:t-1})$ is the prior distribution at time (t);

$f(z_t|x_t^k, z_{1:t-1})$ is a multi-target likelihood function which implements the occlusion process, according:

$$-\log f(z_t|x_t^k, z_{1:t-1}) \approx L^k(z_t|w^k) + \sum_{m\neq k} \int L^m(z_t|w^{m|k}) q(x_t^m|z_{1:t-1}) dx_t^m$$

where:

$L^k(z_t|w^k)$, a foreground term, is the degree of dissimilarity between visual features extracted from the identified image region and a corresponding characterization, or appearance model, of the target; and $\int L^m(z_t|w^{m|k}) q(x_t^m|z_{1:t-1}) dx_t^m$, a background term, is the further dissimilarity term per each other tracked target.

3. The method according to claim 2, wherein said foreground term, $L^k(z_t|w^k)$, calculates a dissimilarity score between the image part where target k is expected to be visible, and its appearance model by the following steps:

the image region identified by the shape model for the hypothesis $x_t^k$ under analysis is first calculated;

pixel weights $w^k$ are computed within the image area;

weighted appearance features are extracted from that region and compared to the appearance model of the target; and the comparison being made in terms of a distance function between extracted and modeled appearance features and defining the value of $L^k(z_t|w^k)$.

4. The method according to claim 2, wherein the background term, $\int L^m(z_t|w^{m|k}) q(x_t^m|z_{1:t-1}) dx_t^m$, takes into account the occlusion evidence derived from the presence of target m≠k, and is computed as the expectation of the foreground term of m under prior $q(x_t^m|z_{1:t-1})$ when the configuration of k is blocked to hypothesis $X_t^k$ under analysis; and in that, for each $x_t^m$, a foreground score, $L^m(z_t|w^{m|k})$, is computed, using weight maps $w^{m|k}$; the scores are modulated with the prior $q(x_t^m|z_{1:t-1})$ and integrated.

5. The method according to claim 2, wherein the pixel weights and weight maps $w^k$, $w^{m|k}$ are scalar images computed by attributing to each pixel of z a probability value in the range [0,1], the probability value being interpreted as the importance of that pixel when computing the likelihood score for target k.

6. The method according to claim 5, characterized in that the pixel weights and weight maps $w^k$, $w^{m|k}$ are computed for each pixel u as follows:

$$w^k(u) = \begin{cases} \prod_{m\neq k}\left(1 - \int_{x_t^m <_u x_t^k} q(x_t^m|z_{1:t-1}) dx_t^m\right) & \text{if } x_t^k <_u \infty \\ 0 & \text{elsewhere,} \end{cases}$$

$$w^{m|k}(u) = \begin{cases} \prod_{n\neq k,m}\left(1 - \int_{x_t^n <_u x_t^m} q(x_t^n|z_{1:t-1}) dx_t^n\right) & \text{if } x_t^m <_u x_t^k <_u \infty \\ 0 & \text{elsewhere.} \end{cases}$$

where $x_t^m <_u x_t^k$ identifies the set of configurations $x_t^m$ which, according to associated shape rendering function, render closer to the image recording device in pixel u than configuration $x_t^k$, relation $x_t^k <_u \infty$ is meant to be true when $x_t^k$ is observable in pixel u.

7. The method according to claim 1, wherein the shape rendering function is a user-defined shape model of the target that is rendered onto the image for the specific configuration under analysis.

8. The method according to claim 1, wherein the computing of the degree of dissimilarity is user defined.

9. An apparatus for tracking a number of objects or object parts in image sequences comprising:

a processor;

said processor computing a probability distribution for the previous image, at time (t−1), and propagating the probability distribution to the new image, at time (t), according to a probabilistic model of target dynamics, to obtain a predicted, or prior, distribution at time (t); and said processor aligning the predicted distribution, at time (t), with the evidence contained in the new image, at time (t), according to a probabilistic model of visual likelihood, to obtain a posterior distribution at time (t);

said processor aligning the predicted distribution, at time (t), of a hypothetic target configuration associated with a new frame by, identifying the image portion in which the target under consideration is expected to be visible under the current configuration, by using a shape rendering function, assigning a probability value to each pixel of the identified image portion, which is computed as a probability of the target under consideration is expected to be visible under the current configuration being occluded by another target, the probability of the target under consideration being expected to be visible under the current configuration being occluded by another target being derived from prior distributions and shape models of other targets, computing a degree of dissimilarity between visual features extracted from the identified image portion and a corresponding characterization, or appearance model, of the target, the importance, or weight, of the different pixels in this calculation being calculated by the probability of the target under consideration being expected to be visible under the current configuration being occluded, adding, to the value of degree of dissimilarity, a further dissimilarity term per each other tracked target, each further dissimilarity term being computed in form of an expectation, under a prior distribution, of the dissimilarity values, the expectation of dissimilarity values being calculated on configurations that map closer to an image recording device than the target under analysis wherein the target, currently under consideration, being neglected, and calculating a distribution value, assigned to the hypothetic target configuration of the target under analysis, by multiplying a prior value with the negative exponential of the overall dissimilarity score.

10. A recordable computer readable medium having a program recorded thereon, adapted to cause a process to be executed on a computer, the process comprising:

computing a probability distribution for the previous image, at time (t-1), and propagating the probability distribution to the new image, at time (t), according to a probabilistic model of target dynamics, to obtain a predicted, or prior, distribution at time (t); and aligning the predicted distribution, at time (t), with the evidence contained in the new image, at time (t), according to a probabilistic model of visual likelihood, to obtain a posterior distribution at time (t);

wherein aligning the predicted distribution, at time (t), of a hypothetic target configuration associated with a new frame by performing image analysis includes, identifying the image portion in which the target under consideration is expected to be visible under the current configuration, by using a shape rendering function, assigning a probability value to each pixel of the identified image portion, which is computed as a probability of the target under consideration is expected to be visible under the current configuration being occluded by another target, the probability of the target under consideration being expected to be visible under the current configuration being occluded by another target being derived from prior distributions and shape models of other targets, computing a degree of dissimilarity between visual features extracted from the identified image portion and a corresponding characterization, or appearance model, of the target, the importance, or weight, of the different pixels in this calculation being calculated by the probability of the target under consideration being expected to be visible under the current configuration being occluded, adding, to the value of degree of dissimilarity, a further dissimilarity term per each other tracked target, each further dissimilarity term being computed in form of an expectation, under a prior distribution, of the dissimilarity values, the expectation of dissimilarity values being calculated on configurations that map closer to an image recording device than the target under analysis wherein the target, currently under consideration, being neglected, and calculating a distribution value, assigned to the hypothetic target configuration of the target under analysis, by multiplying a prior value with the negative exponential of the overall dissimilarity score.

* * * * *